W. C. MILLER.
WATER CURRENT MOTOR.
APPLICATION FILED JUNE 29, 1915.

1,208,611.

Patented Dec. 12, 1916.
2 SHEETS—SHEET 1.

Inventor,
W. C. Miller.

By Victor J. Evans,
Attorney.

Witnesses:

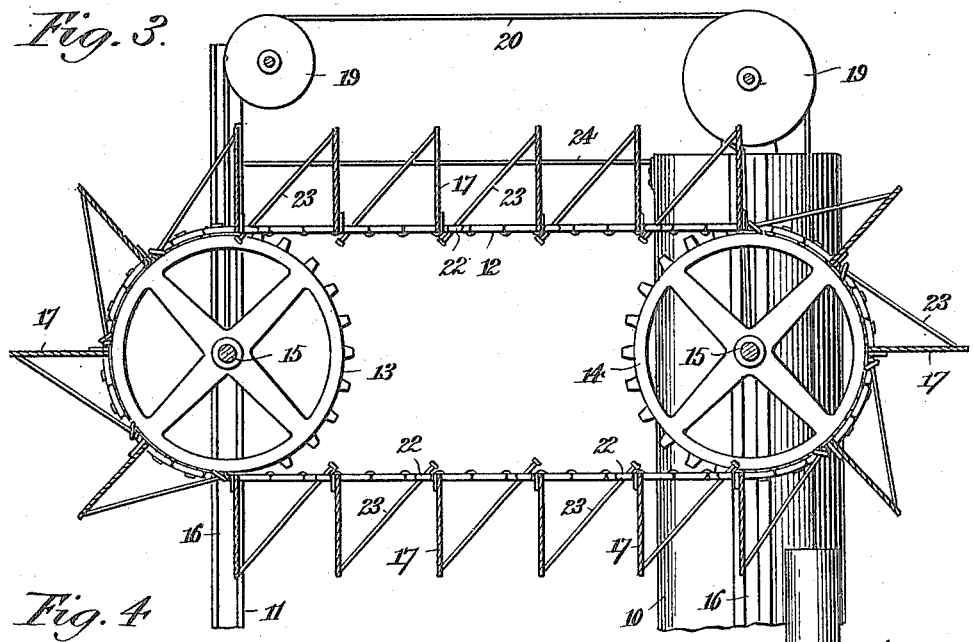
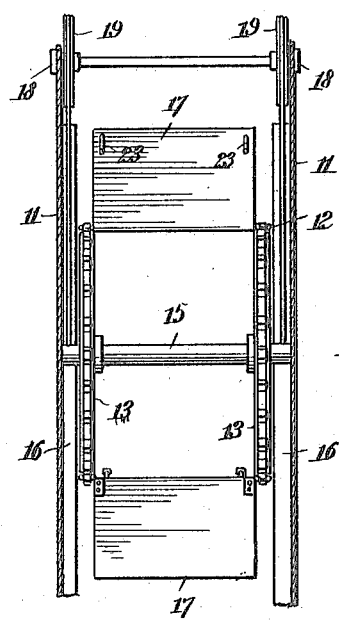
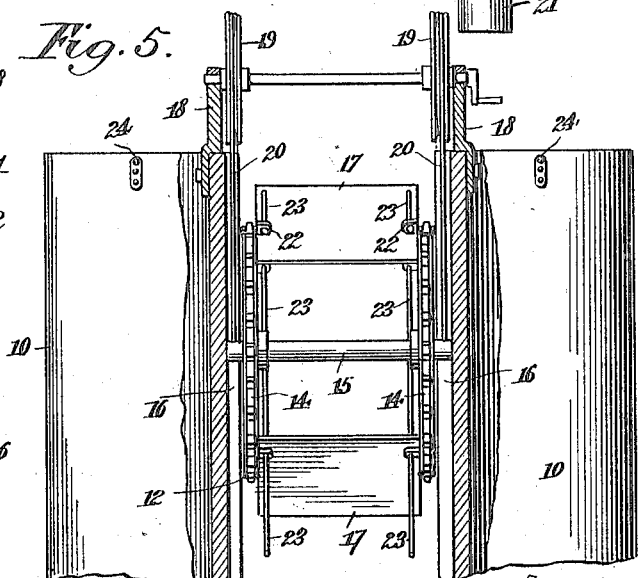

UNITED STATES PATENT OFFICE.

WARREN C. MILLER, OF MEDFORD, OREGON.

WATER-CURRENT MOTOR.

1,208,611.  Specification of Letters Patent.  Patented Dec. 12, 1916.

Application filed June 29, 1915. Serial No. 37,007.

*To all whom it may concern:*

Be it known that I, WARREN C. MILLER, a citizen of the United States, residing at Medford, on Route No. 4, in the county of Jackson and State of Oregon, have invented new and useful Improvements in Water-Current Motors, of which the following is a specification.

The invention relates to motors, and more particularly to the class of water current motors.

The primary object of the invention is the provision of a motor of this character wherein the currents of a water stream are utilized to operate the motor, which serves to drive machinery or the like, or for producing electricity.

Another object of the invention is the provision of a motor of this character wherein the water blades can be raised and lowered relative to the body of water, and when in raised position the motor is inactive, the said motor being of novel construction so that the power from flowing water can be made use of for driving energy.

A further object of the invention is the provision of a motor of this character which is simple in construction, strong, durable, and efficient in operation, and inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
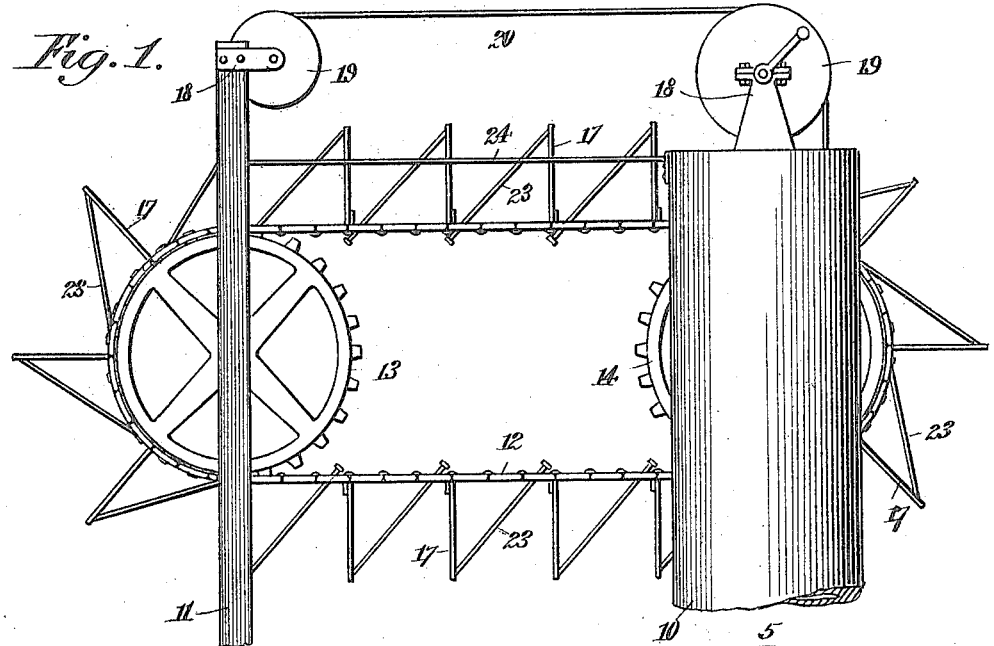
Figure 2:
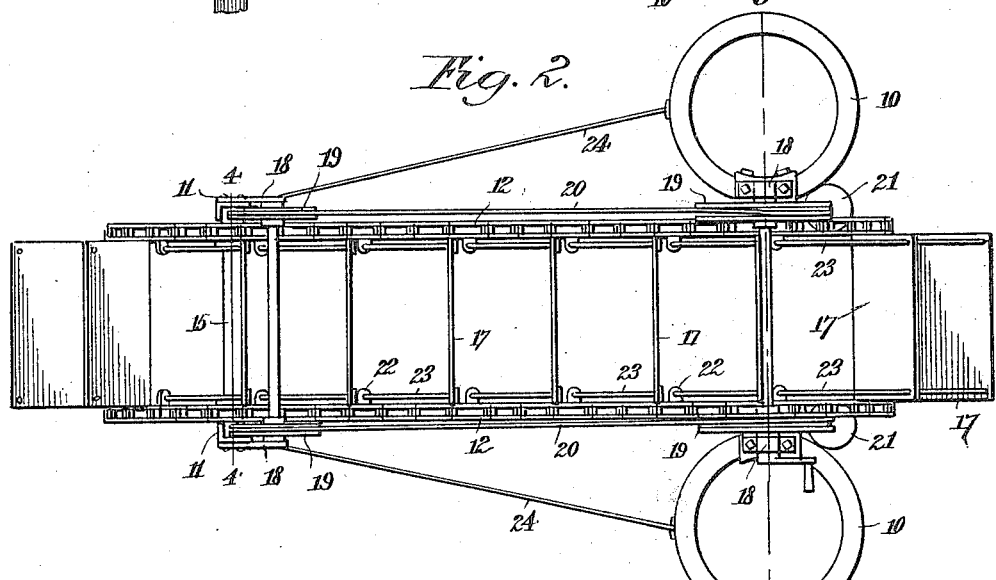

In the drawings:—Figure 1 is a side elevation of a motor constructed in accordance with the invention. Fig. 2 is a top plan view thereof. Fig. 3 is a vertical longitudinal sectional view of the same. Fig. 4 is a sectional view on the line 4—4 of Fig. 2. Fig. 5 is a sectional view on the line 5—5 of Fig. 1.

Similar reference characters indicate corresponding parts throughout the several views in the drawings.

Referring to the drawings in detail, the water motor comprises a pair of spaced vertical caissons 10, of tubiform, which have their lower ends suitably anchored in the bed of a water course at a point where there is a suitable depth of water, while located a distance therefrom at a point down stream is a pair of vertical substantially U-shaped or channeled beams 11 which, together with the caissons, constitute the supporting structure for the motor mechanism hereinafter fully described. In providing my device with the tubular or hollow caissons, the same may be filled with sand or other material to hold the device in stationary position within a stream.

The motor mechanism comprises a pair of spaced endless chains 12, which are trained over the respective sprocket wheels 13 and 14, which are fixed in spaced relation to each other of the pairs upon axles 15, each of which is slidably fitted in the guideways 16 formed in the respective caissons 10 and beams 11 so that the said axles can be raised or lowered relative to the body of water. Mounted at intervals throughout the stretches of the chains 12 to be carried thereby are water wings or blades 17 which receive impacts from the body of water while flowing downstream, and the force of such water serves to drive the chains 12 which in turn rotate the sprocket wheels 13 and 14, whereby on the connection of machinery or the like with one of the axles 15 or with both of the same the power from the water can be utilized for driving such machinery or the like.

Mounted at the upper ends of the caissons 10 are pulley supports 18 in which are journaled pulleys 19 over which are trained raising and lowering cables 20, each of which is secured to the axles 15 supporting the sprocket wheels 14, and at the free ends of these cables are carried weights 21 which are suspended without the casings so as to balance the motor mechanism at this end. On the raising and lowering of the axles 15 supporting the sprocket wheels 14 the blades or wings 17 on the chains 12 can be adjusted to active or inactive position relative to the body of water constituting the stream. Certain of the links of the chains 12 are formed with laterally outwardly extending eyes 22 in which are engaged brace rods 23, the same being connected with the wings or blades 17 to strengthen the same for receiving the flow impact from the water as the same flows down stream. Connected to the caissons 10 and also to the beams 11 are bracing cables 24 which serve to strengthen the same which constitute the support for the motor mechanism. It is of course to be understood that the blades may be of any desirable shape, either straight, as shown, or with one blade straight and two curved in alternate relation to each other.

From the foregoing description, taken in connection with the accompanying drawings, the construction and manner of operation of the device will be clearly understood, and therefore a more extended explanation has been omitted.

What is claimed is:—

A fluid current motor comprising a pair of hollow caissons arranged in parallel spaced relation and having the confronting faces thereof provided with vertically extending guideways, a pair of vertical beams arranged in spaced relation to the caissons and in alinement with the guideways, said beams being spaced from each other and having the confronting faces thereof formed with vertically extending channels, shafts slidably mounted in the guideways and in the channels, sprocket wheels keyed to each of the shafts, said sprocket chains trained over the sprocket wheels, blades mounted on the chains, pulleys journaled at the upper ends of the beams and caissons, and weighted cables connected to the shafts and trained over the pulleys, said cables being secured to the opposite extremities of the shafts and lying in said channels and guideways.

In testimony whereof I affix my signature in presence of two witnesses.

WARREN C. MILLER.

Witnesses:
BEN. J. TROWBRIDGE,
F. G. THAYER.

Copies of this patent may be obtained for five cents each, by addressing the "Commissioner of Patents, Washington, D. C."